A. KINGSBURY.
THRUST BEARING.
APPLICATION FILED APR. 5, 1916.
1,293,471.
Patented Feb. 4, 1919.
2 SHEETS—SHEET 1.
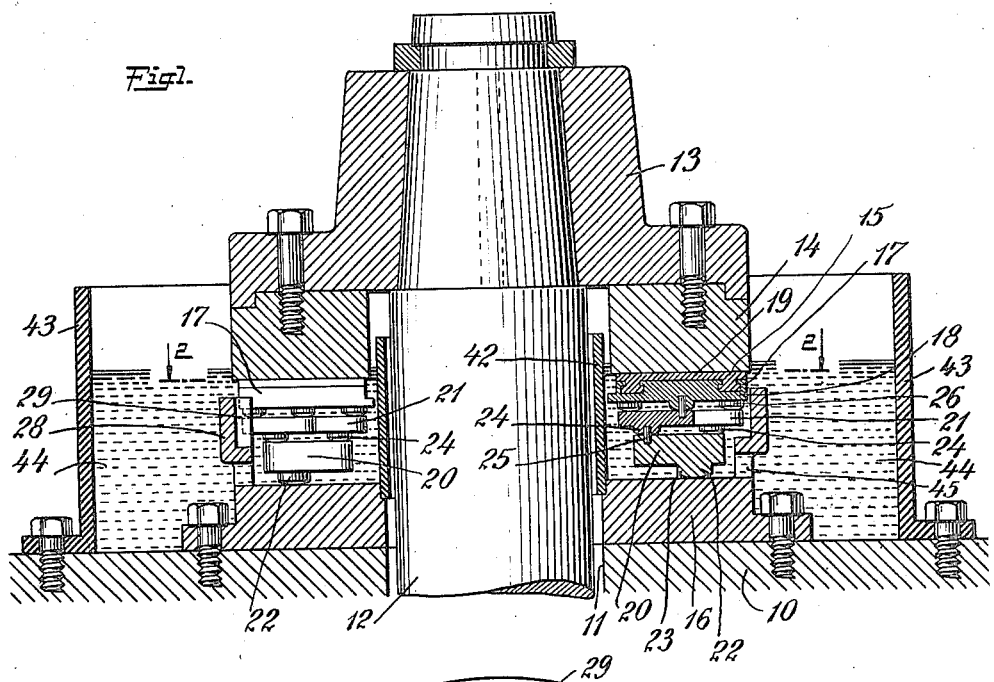
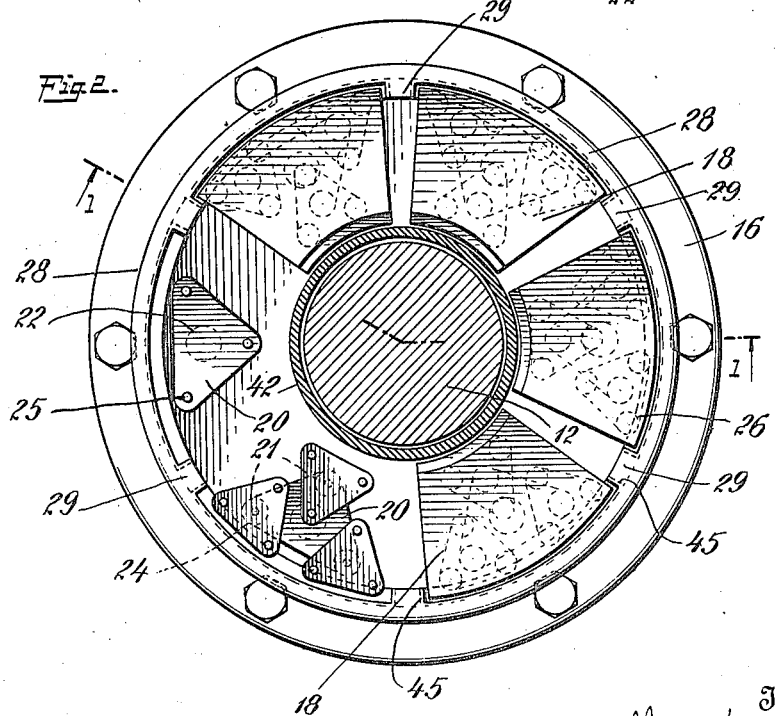
Inventor
Albert Kingsbury
By his Attorney

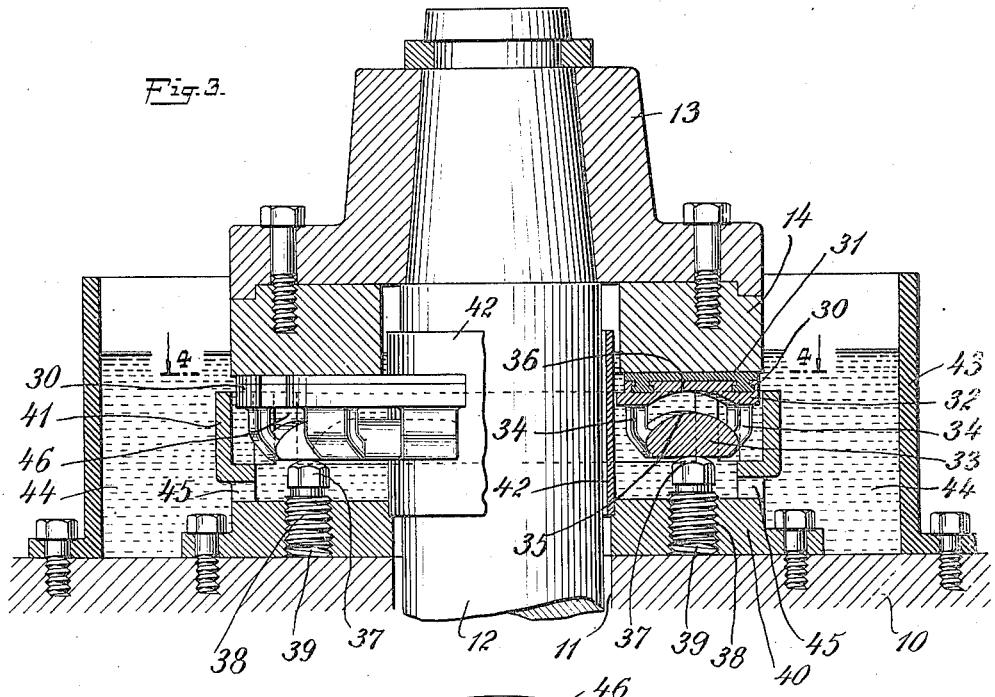
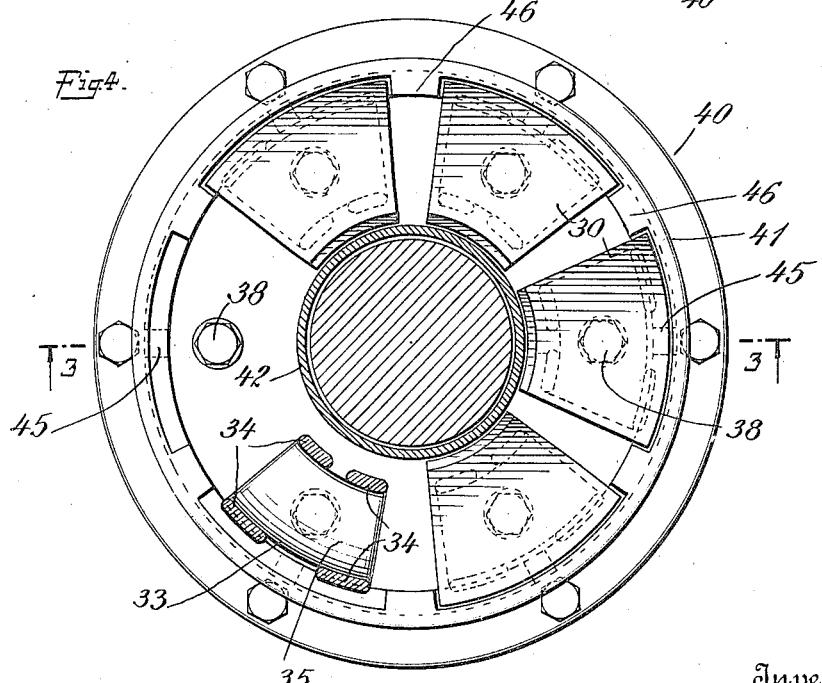

# UNITED STATES PATENT OFFICE.

ALBERT KINGSBURY, OF PITTSBURGH, PENNSYLVANIA.

THRUST-BEARING.

1,293,471.

Specification of Letters Patent.

Patented Feb. 4, 1919.

Application filed April 5, 1916. Serial No. 89,000.

*To all whom it may concern:*

Be it known that I, ALBERT KINGSBURY, a citizen of the United States, and a resident of Pittsburgh, Allegheny county, and State of Pennsylvania, have invented certain new and useful Improvements in Thrust-Bearings, of which the following is a specification, reference being had to the accompanying drawings, forming a part thereof.

My invention relates to thrust bearings having tiltably supported bearing members or shoes.

In my Patent No. 1,102,276, granted July 7, 1914, I have shown and described a bearing of this character comprising means for so supporting each shoe or member as to avoid concentration of pressure due to the reaction of the support on the shoe whereby a distortion of the shoe is prevented, without interfering with its tilting in response to the wedging action of the lubricating fluid when the bearing is in operation.

However, when a thrust bearing of this general character is in operation, not only does the shoe if centrally supported, become distorted, but also the thrust collar becomes crowned, with the result that two convex surfaces are in contact. The distortion of the surfaces is caused by differences of temperature, different rates of conduction of heat from the metals and different coefficients of expansion between the babbitt face, if such is provided, and the body of the shoe, which is usually composed of iron or steel.

According to my present invention I not only support the shoe so as to distribute the reaction of the support but also make the shoe sufficiently flexible to enable its surface to conform to the convex surface of the collar. In other words the shoe is so supported and so constructed, that its surface may assume a concave shape to conform to the opposed bearing surface.

One object of my present invention is to provide a simple and reliable bearing member embodying particularly effective means for preventing the improper distortion of that portion of the tiltable member which is provided with the bearing surface even if the bearing surface is relatively large.

Another object is to provide a unitary tiltable member which possesses all the advantages of a one-piece bearing shoe and at the same time avoids the possibility of improperly distorting the bearing surface.

Another object is to provide a bearing shoe that shall truly coöperate with and conform to the opposed bearing surface although the latter is crowned or distorted when the bearing is in operation as hereinafter explained.

Other objects and advantages of my invention will be set forth hereinafter, and in order that my invention may be thoroughly understood, I will now proceed to describe the same in the following specification, and then point out the novel features thereof in appended claims.

Referring to the drawings:

Figure 1 is a sectional elevation taken on the line 1—1 of Fig. 2, of a bearing which embodies my invention.

Fig. 2 is a partially sectional plan view on the line 2—2 of Fig. 1.

Figs. 3 and 4 are views corresponding respectively to Figs. 1 and 2, of a modified structure which embodies my invention, Fig. 3 being taken on the line 3—3 of Fig. 4, and Fig. 4 on the line 4—4 of Fig. 3.

Referring first to Figs. 1 and 2, the structure here shown comprises a stationary frame 10 having a hole or opening 11 through which extends a shaft 12. Secured to the shaft near its upper end is a thrust block 13 to which is bolted or otherwise attached a thrust collar 14 having an annular bearing surface 15.

Bolted or otherwise secured to the frame is a base 16 upon which a plurality of bearing shoes 17 are tiltably mounted. Each of the shoes 17 in the structure here shown, comprises a bearing plate 18 which is preferably faced with soft metal as indicated at 19, a triangular supporting block 20, and a plurality of interposed spacing blocks 21. The supporting block 20 has a downwardly extending projection 22 having a curved bottom surface 23 which rests upon the base 16 and forms a tiltable mounting for the shoe 17 of which the block is a part.

Each of the spacing blocks 21, of which there are three, is triangular in form and has a downwardly extending projection 24 which is seated upon one corner of the supporting block 20, the three spacing blocks being mounted on the several corners of the triangular supporting block and held in position by pins 25, or other suitable means.

Each of the bearing plates 18 has a plurality of downwardly extending projections 110 or lugs 26 which rest upon the respective corners of the spacing blocks 21. Thus, in the form shown, the plate has nine downwardly extending projections, resting on the several corners of the three spacing blocks. The distribution of the projections is preferably symmetrical and to a greater or less degree, uniform, with reference to the area of the bearing surface of the shoe plate. The arrangement is clearly shown in Fig. 2.

By this means the bearing plate, which is provided with a bearing surface and is directly subjected to the wedging action of the lubricating fluid when the bearing is in operation, is relatively flexible and supported at many points. Furthermore, the intermediate spacing blocks are so mounted as to equalize to a greater or less degree, the pressure over the surface of the plate. Thus, not only is the convex curving of the bearing surface or other improper distortion of the bearing plate prevented, but furthermore the plate is adapted to conform to the surface of the thrust collar or other opposed bearing surface with which it coöperates even though the latter is crowned or curved in operation.

At the same time the shoe acts as a unit as far as its operation is concerned, and it is free to tilt as a whole upon the downwardly extending projection 22 of the supporting block which is one of its parts.

The interposition of the spacing blocks provides a means for taking up and distributing the forces over the surface of the bearing plate without relying upon the distortion of the supporting block.

The blocks 20 are tiltably mounted and may be supported in any suitable manner. The base 16 is preferably formed as clearly shown in Fig. 1, to provide a flange or annular projection 28, to hold the parts in place and prevent the rotation of the bearing members on their pivots. It is, furthermore, provided with projections 29 which extend between the bearing plates 18 and prevent the rotation of the shoes with the thrust collar. Each shoe is held radially between the annular projection 28 and a sleeve 42 which forms part of the base 16.

The spacing blocks may be quadrilateral or of any suitable shape and the supporting block may be modified to support more or less than three spacing blocks if desired. When more than three points of load application are used, the equalization depends somewhat on the elasticity of the parts.

The base 16 has a sleeve 42 which is close to the shaft 12 and coöperates with a wall or casing 43 in providing a chamber 44 for lubricating fluid. Holes 45 are provided in the flange 28 to permit the lubricating fluid to circulate freely.

The structure of Figs. 3 and 4 in which corresponding parts are designated by the same reference characters, differs from that of Figs. 1 and 2 in the structure and mounting of the tiltable bearing shoes. As clearly shown in Fig. 3, the bearing shoes which are here designated 30 are unitary structures which may be integral if desired. Each shoe is preferably provided with a face 31 of soft metal and is composed of a bearing member 32, a supporting member 33, and spacing lugs or webs 34. The supporting member has the same form in general, as the bearing member, but is slightly smaller, and has a convex top as viewed in plan, which is directly opposite a concave surface 35 which is directly opposite a concave surface 36 of the bearing member. The concavity of 32 makes it flexible, and the convexity of 33 makes it rigid. Neither is essential to the invention.

The support is mounted upon the spherically curved head 37 of a screw 38 constituting an adjustable pivotal support. The several screws or studs on which the bearing shoes are mounted are screwed into tapped holes 39 in the base 40 which corresponds to the base 16.

The shoes may, of course, be tiltably supported in any suitable manner.

The spacing lugs or webs 34 are distributed, as clearly indicated in Fig. 4, so as to support the bearing member near its edges and to prevent its distortion when the bearing is in operation. At the same time, the structure may be made in one piece and is tiltingly supported so that the lubricating fluid is automatically wedged between the bearing surfaces when the bearing is in operation.

The base 40 has a flange 41, corresponding to the flange 28 and similarly provided with projections 46 which extend between the shoes (see Fig. 4).

The structures illustrated may be modified in various ways within the spirit and scope of my invention, and I intend that only such limitations be imposed as are indicated in appended claims.

What I claim is:

1. A bearing shoe composed of a supporting member adapted to be tiltably mounted, a flexible bearing surface member adapted to be subjected to the wedging action of the lubricating fluid when the bearing is in operation, and interposed means for supporting the bearing member at a plurality of distributed points.

2. A bearing shoe composed of a supporting member adapted to be tiltably mounted, a flexible bearing surface member adapted to be subjected to the wedging action of the lubricating fluid when the bearing is in operation, and interposed means for supporting the bearing member at a plurality of distributed points.

3. A bearing shoe composed of a supporting member adapted to be tiltably mounted, a unitary bearing member adapted to be subjected to the wedging action of the lubricating fluid when the bearing is in operation, and interposed means for distributing with substantial uniformity the reactive pressure of the support over the surface of the unitary bearing member to prevent crowning of said surface.

4. A bearing shoe composed of a supporting member adapted to be tiltably mounted, a bearing member adapted to be subjected to the wedging action of the lubricating fluid when the bearing is in operation, and interposed spacing blocks for supporting the bearing member at a plurality of distributed points.

5. A bearing shoe composed of a supporting member adapted to be tiltably mounted, a flexible bearing member adapted to be subjected to the wedging action of the lubricating fluid when the bearing is in operation, and interposed spacing blocks.

6. A bearing shoe composed of a supporting member adapted to be tiltably mounted, a bearing member adapted to be subjected to the wedging action of the lubricating fluid when the bearing is in operation, and interposed spacing blocks engaging the bearing member at a plurality of distributed points and each having a single point of engagement with the supporting member.

7. A bearing shoe composed of a supporting member adapted to be tiltably mounted, a flexible bearing member adapted to be subjected to the wedging action of the lubricating fluid when the bearing is in operation, and interposed spacing blocks engaging the bearing member at a plurality of distributed points and each having a single point of engagement with the supporting member.

8. A bearing shoe composed of a supporting member adapted to be tiltably mounted, a bearing member adapted to be subjected to the wedging action of the lubricating fluid when the bearing is in operation, and interposed triangular spacing blocks having upwardly extending corner projections to engage the bearing member, and a downwardly extending, substantially central projection engaging the supporting member.

9. A bearing shoe composed of a triangular supporting member adapted to be tiltably mounted, a bearing member adapted to be subjected to the wedging action of the lubricating fluid when the bearing shoe is in operation, and three interposed triangular spacing blocks having downwardly extending substantially central projections mounted upon the triangular supporting member near its respective vertices.

10. A bearing comprising a member having a thrust surface and an independently tiltable bearing shoe having a flexible bearing surface member adapted to coöperate with and conform to said thrust surface, and means for supporting said flexible surface member at a plurality of distributed points.

11. A bearing comprising a tiltable bearing shoe having a flexible bearing surface member and a plurality of independent members for supporting said flexible surface member at a plurality of distributed points.

In witness whereof I have hereunto set my hand this 30th day of March, 1916.

ALBERT KINGSBURY.